United States Patent
Di Tanna et al.

(10) Patent No.: US 9,930,495 B2
(45) Date of Patent: Mar. 27, 2018

(54) METHOD FOR THE DYNAMIC ADJUSTMENT METHOD OF OPERATING PARAMETERS OF A VEHICLE

(71) Applicant: PIAGGIO & C. S.p.A., Pontedera, Pisa (IT)

(72) Inventors: Onorino Di Tanna, Pisa (IT); Mario Santucci, Pisa (IT); Stivi Peron, Pisa (IT)

(73) Assignee: PIAGGIO & C. S.p.A., Pontedera, Pisa (IT)

( * ) Notice: Subject to any disclaimer, the term of this patent is extended or adjusted under 35 U.S.C. 154(b) by 0 days.

(21) Appl. No.: 15/520,047

(22) PCT Filed: Oct. 19, 2015

(86) PCT No.: PCT/IB2015/001998
§ 371 (c)(1),
(2) Date: Apr. 18, 2017

(87) PCT Pub. No.: WO2016/067086
PCT Pub. Date: May 6, 2016

(65) Prior Publication Data
US 2017/0318435 A1    Nov. 2, 2017

(30) Foreign Application Priority Data

Oct. 31, 2014    (IT) .............................. RM2014A0629

(51) Int. Cl.
*H04M 3/00* (2006.01)
*H04W 4/04* (2009.01)
(Continued)

(52) U.S. Cl.
CPC ........ *H04W 4/04* (2013.01); *B60G 17/01941* (2013.01); *H04W 4/02* (2013.01);
(Continued)

(58) Field of Classification Search
CPC ................................ G07C 5/008; G05D 1/024
(Continued)

(56) References Cited

U.S. PATENT DOCUMENTS

2010/0030437 A1    2/2010   Kim et al.
2012/0022781 A1*   1/2012   Wilson ............... G01C 21/3469
                                                         701/410

(Continued)

FOREIGN PATENT DOCUMENTS

DE    10 2004 040 351 A1    3/2006
JP        2004-013290 A1    1/2004
WO       2009/109818 A1    9/2009

OTHER PUBLICATIONS

"HP Calibration Kit 2, S1000 RR, HP4", Jan. 1, 2013, retrieved from the Internet: http://www.bmw-motorrad.com/fi/fi/index.html?content = http://www.bmw-motorrad.com/fi/fi/motorsports/hp-race/hp-race/parts/ecu-electrics/ecu/hp-race-calibration-kit-2.html, 3 pgs.

(Continued)

*Primary Examiner* — Kiet Doan
(74) *Attorney, Agent, or Firm* — Merchant & Gould P.C.

(57) ABSTRACT

A dynamic adjustment method while driving a vehicle of at least one vehicle operating parameter is for a vehicle having an electronic control unit adapted to set the operating parameter, and a communication interface operatively connected to the electronic control unit. An application program is installed on board a portable processing device including a communication interface communicating with the vehicle communication interface. The application program accesses an electronic map of a path and divides the path in sectors. Operating parameter values are stored via the application program, each value being associated to a corresponding sector. While driving, the sector occupied by the vehicle is identified in real time. Values are transmitted sector by (Continued)

sector, from the portable processing device to the electronic control unit so that the electronic control unit sets, sector by sector, the vehicle operating parameter vehicle to the value associated to the occupied sector.

13 Claims, 2 Drawing Sheets

(51) Int. Cl.
  *B60G 17/019* (2006.01)
  *H04W 4/02* (2018.01)
  *B60W 50/00* (2006.01)
(52) U.S. Cl.
  CPC ....... *B60G 2401/16* (2013.01); *B60T 2210/36* (2013.01); *B60W 2050/0002* (2013.01)
(58) Field of Classification Search
  USPC .............. 701/410, 533, 37, 32.9, 31.4, 33.4; 705/14.63, 4; 455/456.1, 419, 562.1, 296
  See application file for complete search history.

(56) References Cited

U.S. PATENT DOCUMENTS

| | | | | |
|---|---|---|---|---|
| 2013/0145360 A1* | 6/2013 | Ricci | ........................ | G06F 9/54 |
| | | | | 717/174 |
| 2014/0109080 A1* | 4/2014 | Ricci | ........................ | G06F 8/61 |
| | | | | 717/174 |

OTHER PUBLICATIONS

"Zero Motorcycles—Android Apps on Google Play", Google Play, Sep. 22, 2014, retrieved from the Internet: https://play.google.com/store/apps/details?id=com.ZeroMotorcycles&hl=en, 2 pgs.
International Search Report and Written Opinion of the International Searching Authority for corresponding International Patent Application No. PCT/IB2015/001998 dated Feb. 9, 2016, 11 pgs.

* cited by examiner

METHOD FOR THE DYNAMIC ADJUSTMENT METHOD OF OPERATING PARAMETERS OF A VEHICLE

This application is a National Stage Application of PCT/IB2015/001998, filed 19 Oct. 2015, which claims benefit of Serial No. RM2014A000629, filed 31 Oct. 2014 in Italy and which applications are incorporated herein by reference. To the extent appropriate, a claim of priority is made to each of the above disclosed applications.

BACKGROUND OF THE INVENTION

The present description refers to the technical filed of the vehicle dynamic control systems and, more particularly, concerns a dynamic adjustment method of at least one vehicle operating parameter.

Currently, on a growing number of vehicles it is possible to make electronic settings of several parameters, which are affect their performances and dynamic, such as for example the response of an electronic throttle, the response of an electronic suspension, the response of the control system of the brake system, adjustment parameters of the engine operation, etc.

Usually, the vehicle driver must set the vehicle for the best for the path features before starting to drive and he/she cannot act on the adjustment of the operating parameters in real time without distracting attention from driving, except for few parameters whose adjustment can be done acting on actuators such as levers or buttons present on board of the vehicle. Anyway, any manual adjustment while driving a vehicle is a source of distraction and compromises the driving safety level or the performances of the driving itself.

SUMMARY OF THE INVENTION

The object of the present description is to make a solution available, which allows overcoming the above-described drawbacks with reference to the known art.

BRIEF DESCRIPTION OF THE DRAWINGS

The invention will be better understood from the following detailed description of a particular embodiment given by way of non-limiting example, with reference to the attached drawings, where.

DETAILED DESCRIPTION OF THE PREFERRED EMBODIMENT(S)

In the figures, similar or same elements will be shown by means of the same numeric references.

Figure 1:
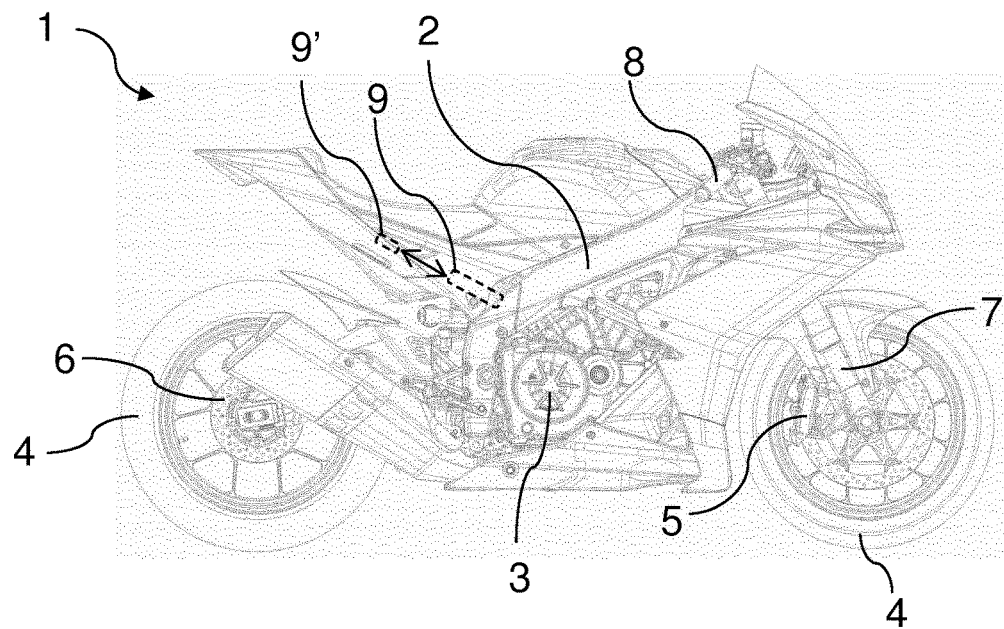
FIG. 1 is a schematic view of a possible embodiment of a system adapted to execute a dynamic adjustment method of at least one vehicle operating parameter.
Figure 1:
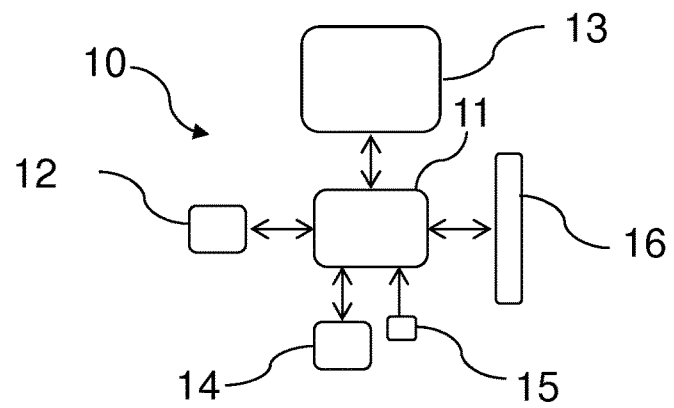

With reference to FIG. 1, it is shown an illustrative and non-limiting embodiment of a system adapted to execute an adjustment method of at least one operating parameter of the vehicle 1 while driving a vehicle 1. The above-mentioned system includes a vehicle 1 and a portable processing device 10.

In the particular example being depicted, without any limitation, the vehicle 1 is a sports motorcycle including a frame 2, a thermal engine 3, and a pair of wheels 4.

According to one possible non-limiting embodiment, the vehicle 1 is in general a cycle or a motorcycle.

In addition, in FIG. 1 only few devices of the vehicle 1 have been marked with a reference number, such as a front brake 5, a rear brake 6, a front suspension 7, a throttle knob 8. At least one of said devices 5-8 is an electronically controllable device, in that it is possible to set at least one operating parameter thereof in a reconfigurable way.

The vehicle 1 includes an electronic control unit 9 adapted to set an operating parameter of the vehicle 1 and at least one communication interface 9' operatively connected to the electronic control unit 9 or included thereinto. In FIG. 1 the electronic control unit and the communication interface 9' are represented by means of dotted lines as they are not generally visible from the outside of the vehicle 1.

The communication interface 9' is preferably a wireless communication interface, more preferably a bidirectional wireless interface. For example, the communication interface 9' is a Bluetooth communication interface.

The system of FIG. 1 also includes a portable processing device 10, external to the vehicle 1, including a communication interface 12 adapted to communicate with the communication interface 9' of the vehicle 1. For example, also the communication interface 12 is a bidirectional wireless communication interface, for example a Bluetooth interface.

According to one embodiment, the portable processing device 10 is a smartphone or a tablet, in other words a personal communication mobile device including a data interface 14 for the connection to a telecommunication network and a touchscreen display 13. The data interface 12 is for example a 3G and/or 4G and/or LTE and/or Wi-Fi modem. In the example of FIG. 1 the portable processing device 10 includes a processing unit 11 operatively connected to the communication interface 12, the touchscreen display 13, and the data interface 14. In the example, the portable processing device 10 also includes a memory 16 and a geo-localization antenna (for example a satellite geo-localization antenna, such as for example a GPS antenna) both operatively connected to the processing unit 11.

Figure 2:
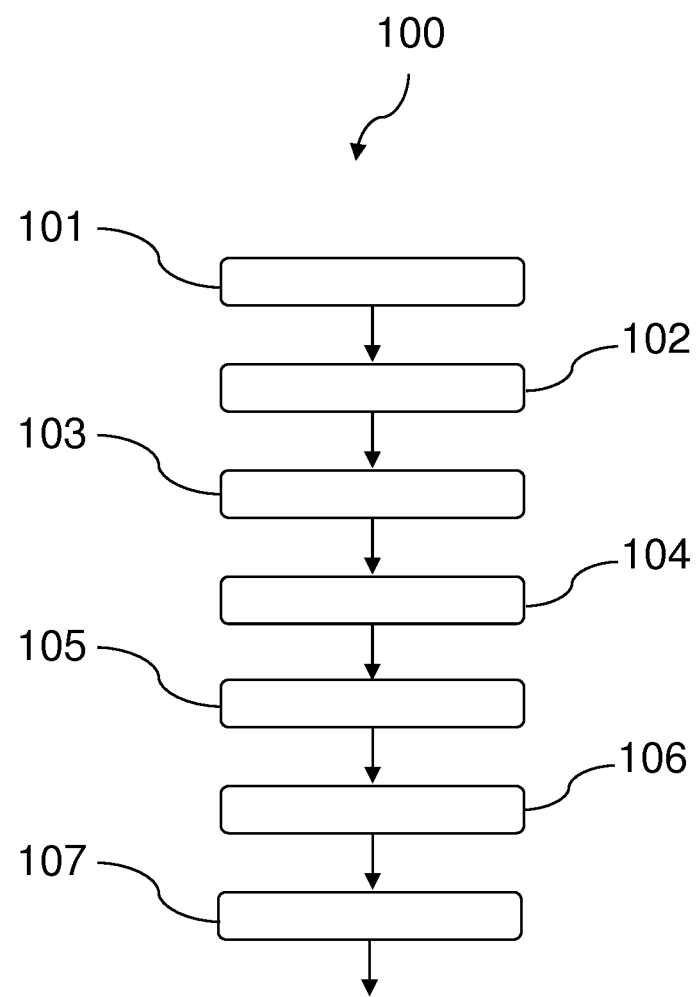
FIG. 2 is a schematic view of a general flow chart of a dynamic adjustment method of at least one vehicle operating parameter.

On board of the portable processing device 10 an application program, called "app" in jargon, is installed including a computer code loadable in the memory 16 and whose instructions are executed by the processing unit 11 in order to execute a dynamic adjustment method 100 of at least one vehicle operating parameter, whose flow chart is schematically represented in FIG. 2.

With reference to FIG. 2, the method 100 includes a step 102 of accessing via the application program an electronic map of a path to be followed by the vehicle 1 and dividing said path in a plurality of sectors. The above-mentioned dividing can be carried out automatically by the application program, for example based on the characteristics of each sector (for example: bend with a wide radius of curvature, bend with a middle radius of curvature, bend with a narrow radius of curvature, hairpin turn, straight, slope, etc.) o via an input by the user.

According to one embodiment, the above-mentioned step 102 of accessing allows a user to select the above-mentioned electronic map from a plurality of maps, for example, being stored in the memory 16. For example, the above-mentioned plurality of maps includes a plurality of maps of racetracks.

The method can include an optional step 101 of selecting the specific model of the vehicle 100; alternatively, by omitting that step 101, it is possible to consider that the application program is dedicated to the specific model of the vehicle 1.

The method 100 also includes a step 103 of storing a plurality of values of the operating parameter by means of the application program, each parameter being associated with a respective sector. In such a way, it is advantageously possible to pre-store the value of one or more parameters regulating the operation of the vehicle 1, for example the performances in terms of torque, braking, acceleration velocity, and balance, by selecting operating parameters values that are specific for each sector of the path to be followed by the vehicle 1.

According to one embodiment, the above-mentioned step 103 of storing the plurality of values includes a step of selecting the values being automatically suggested by the application program or setting a variation with respect to said automatically suggested values.

According to one embodiment, the method 100 can include an automatic verification step 104 of the stored values by the application program and a correction of those values, in case, for example, there are incongruences between values being related to consecutive sectors, or in order to make a global optimization at a whole path level.

While driving the vehicle 1 along the path to be followed, the method 100 also includes a step 105 of identifying in real time the specific sector of the path being occupied from time to time by the vehicle 1 by means of the application program, namely the sector on which the vehicle 1 is. That identification is automatically performed by the application program. For example, the portable processing device 10 includes a geo-localization system and the step 105 of identifying the sector path includes a step of detecting the position of the vehicle 1 in a geo-referenced system by means of the localization system. For example, the localization system is a satellite geo-localization system and includes a GPS signals receiver 15 operatively connected with the processing unit 11. In order to improve the above-mentioned identification step 105 it is possible also to consider that the portable processing device 10 includes an inertial sensor (not shown in figures) whose measurements can be used by the processing unit 11 to improve the identification precision of the covered sector being carried out thanks to the satellite localization system.

Again while driving the vehicle 1 along the path, the method 100 also includes a step 106 of transmitting the plurality of values stored in the step 103, sector by sector, from the portable processing device 10 to the electronic control unit 9 of the vehicle 1 via the communication interfaces 12, 9' so that the electronic control unit 9 of the vehicle 1 sets, sector by sector, the operating parameter of the vehicle 1, or the operating parameters of the vehicle 1, to the specific value associated to the sector occupied.

According to one preferred non-limiting embodiment, the electronic control unit 9 includes a CAN bus and the method 100, after the step 106 of transmitting, includes a step 107 of writing said plurality of values on said CAN bus so that the values can be read from the devices of the vehicle 1 to be controlled. According to one more general embodiment, the electronic control unit 9 includes and uses for the control at least one communication line between itself and said device of the vehicle, wherein said communication line adopts the CAN bus or LIN Bus or KeyWord 2000 protocol, or it is an analogic line.

According to one possible embodiment, the application program installed on board of the portable communication device 10 comprises an offline setting software module and a real-time control software module. In that embodiment, the steps of accessing 102 and storing 103, and possibly also the verification and correction step 104 are carried out while running said offline setting software module while the steps of identifying 105 and transmitting 105 are executed while running said real-time control software module while driving the vehicle 1 along the path.

As already mentioned, by the above-described method 100, it is possible to adjust one or more parameters for one vehicle 1, for example, it is possible to adjust a plurality of parameters, each being adapted to condition the operation of a respective electronically controllable device of the vehicle 1. For example, the above-mentioned operating parameter is an operating parameter of a device of the vehicle 1 included in the following list of devices: an electronic throttle device controllable by the knob 8, an ABS braking device 6, 7, one or more electronic suspensions 7, a thermal or electrical or hybrid engine 3, etc.

The above-mentioned method 100 can also be extended with various functionalities. For example, it is possible to consider a step of optimizing the parameters values in real time as a function of the real driving of the vehicle 1 along the path. Said optimization can be merely suggested by the application program or they can be applied in an automatic way. For example, the variation of the parameters values accounts for the intervention of the controls in each point of the path (anti slipping) or anyway for the result of the control. The gradual or abrupt variations of the road surface and of the tires wear can also cause the variation of the optimal values for the operating parameters; therefore, they can require an optimization in real time.

Moreover, it is possible to consider in the method 100 a further step of elaborating all the repetitions done on the same path (such as for example a track), extrapolating for each sector the best performance obtained with different parameters combinations and thus recommend the optimum combination from the performances point of view.

Moreover, it is possible to record the driving performances and the effective parameters values and, in the implementations via smartphone or tablet, to share the set adjustments and the obtained performances on-line in an enthusiasts community.

According to one possible embodiment, it is possible to improve the performances of the above-described dynamic adjustment method 100, in order to fix some factors that in few occasions could limit those performances, such as the low update frequency (1 Hz) and/or the limited precision (10 m) of the geo-localization modules (for example of the GPS modules, and from now on specified as "GPS modules" without introducing any limitation) being provided for on board of commercial portable processing devices 10 such as for example the smartphones.

In particular, in the identification step 105 the method 100 can use three different methodologies at the same time for the estimate of the position of the vehicle 1 on the path based on the following data:

raw satellite geo-localization data provided by the GPS module;
dynamic data of the vehicle detected by sensors (installed on the mobile device and/or on the vehicle) to estimate the expected vehicle position;
data related to the path map.

Basically, in the above-mentioned embodiment the identification step 105 includes a step of correcting and/or integrating the raw satellite geo-localization data with:

dynamic data of the vehicle detected by sensors (installed on the mobile device and/or on the vehicle) to estimate the expected vehicle position;
data related to the path map.

For example, starting from a fixed initial position (e.g. the finish line of the track), as soon as the velocity of the vehicle 1, as detected by the GPS module or by the on board sensors, exceeds a preset threshold (e.g. 20 km/h), the application program waits for a first pair of valid GPS positions (or in general, geo-localization coordinates provided by a satellite system) coming from the portable processing device 10.

The vector identified by the above-mentioned pair of positions defines the starting point for the calculations of a positioning algorithm (or method), executed in the identification step 105, which considers the following steps:

f1. identifying on the map of the path recorded in the memory of the portable device 10 the value of the nearest curvilinear abscissa to the last valid GPS position;

f2. computing, based on the lateral acceleration of the vehicle and on the forward velocity, the instantaneous curvature of the trajectory;

f3. while waiting a new valid GPS data, extrapolating on a regulable time frame (e.g. 0.03 s) the new estimate of the vehicle position in two ways:

a. positioning the vehicle on the ideal trajectory of the track at one curvilinear coordinate being incremented, with respect to the value previously identified, of a quantity equal to v_vehicle*delta_t, where v_vehicle is the vehicle velocity and delta_t is the time elapsed from the last detected GPS position;

b. positioning the vehicle at the end of a vector having the origin in the last identified position, magnitude equal to v_vehicle*delta_t and direction being coherent with the identified curvature;

f4. determining at any given time an estimate of the vehicle position (X_vehicle, Y_vehicle) carrying out a weighted average among the GPS coordinates detected by the portable processing device 10 and the two determined at the steps f2 and f3 shown above according to the formulae shown below:

$$X\_vehicle=X\_vehicle\_GPS*k1+ X\_vehicle\_sensors*k2+X\_vehicle\_path*k3;$$

$$Y\_vehicle=Y\_vehicle\_GPS*k1+ Y\_vehicle\_sensors*k2+Y\_vehicle\_path*k3.$$

Where:
X_vehicle_GPS, Y_vehicle_GPS are the coordinates of the vehicle position obtained from the step f1;
X_vehicle_sensors, Y_vehicle_sensors are the coordinates of the vehicle position obtained from the step f2;
X_vehicle_path, Y_vehicle_path are the coordinates of the vehicle position obtained from the step f3;
k1, k2, k3 are weighting coefficients.

In case the path selected from user has significant height variations, according to one embodiment, the latter are considered in the curvilinear abscissa development of step f1 described above.

The weights to be inserted in step f4 of determining shown above are experimentally evaluated and they depend on the accuracy grade of the GPS position. The higher the latter, the higher the related weight in spite of the other two (whose ratio can be kept constant).

In the steps where the GPS position is not updated or in case it is identified as not plausible (e.g. distance from preceding position being too different from v_mean_vehicle*delta_t_gps, where v_mean_vehicle is the mean velocity of the vehicle and delta_t_gps is the time interval between two consecutive GPS acquisitions), the related weight coefficients "k1" are set to zero.

In the same way, in case where a suitable description by means of the mean line and (possibly) the altitude of the path occupied by the user is not available, the weight coefficients "k3" are null.

In case where no GPS position data is available for longer than a regulable time, the automatic strategy of changing the control parameters of the vehicle is disabled and all the systems reach the as conservative as possible state or anyway the state identified by the driver as 'safety' setting.

In the described strategy, the vehicle velocity is estimated from the wheels rotational velocity, in particular from the angular velocity of one or more non driving wheels. To avoid that using different tires (or the natural dimensional tolerance thereof) can influence the estimate precision, the above-mentioned method can consider a preliminary calibration step including the following steps:

bringing the vehicle to a stable pre-defined velocity in conditions of straight drive (e.g. 50 km/h);
acquiring the velocity being detected by the GPS;
acquiring the rotational velocity of the vehicle wheels which will be used to estimate the forward velocity of the vehicle itself;
carrying out an average of the velocity samples acquired via GPS and of the wheels rotational velocities;
identifying the rolling height "r" as a ratio between the average of the velocities acquired via GPS and the average of the wheels rotational velocities.

The forward velocity of the vehicle will be identified as product of the rolling height "r" by the velocity or the average of the wheels rotational velocities taken as a reference.

In order to avoid that excess slipping (during braking or accelerating) and/or rear up phenomena on motorcycle vehicles make the carried out measurement not very reliable, it is possible to use techniques known in literature in order to obtain a reliable velocity signal from the integration of inertial sensors and from the velocity identified as reliable before the phenomenon occurred. Examples of such techniques are described in the Italian Patent Applications MI2010A000877 and MI2010A000878 herein incorporated by reference.

Once the vehicle 1 position is known with a good precision on the path by means of the described estimation techniques, it is possible to implement a number of warnings, in parallel to the automatic change of the electronic settings of the vehicle itself, in order to improve the driver's performances with respect to a number of possible pre-set objectives.

In particular, it is possible to provide the driver with advices about braking points or acceleration possibilities by means of acoustic and/or visual signals following the methodology set forth in the following points:

prior evaluation of the ideal performance in terms of velocity at each point of the path based on a mathematical model reproducing the vehicle referred above;
comparison of the velocity value obtained in the previous evaluation step with the effective vehicle velocity;
visual signaling the driver the need to brake or the possibility to accelerate by means of acoustic or visual signal on the mobile device, according to the actual velocity being respectively higher or lower than the 'target' one.

The information constituting the objective of the strategy is determined by simulations of mathematical models of the same vehicle used by the user and they can concern how to obtain the best track lap, the best consumption on a determined track, the smallest pollutants emission, the best driving comfort etc. etc. and however they can be modified punctually or globally by the driver.

To the above-described method one skilled in the art, with the purpose of satisfying particular and specific needs, will be able to make several changes and variations, however all encompassed in the protection scope of the invention as defined by the following claims.

The invention claimed is:

1. A dynamic adjustment method while driving a vehicle of at least one vehicle operating parameter, the vehicle comprising at least one electronic control unit adapted to set said operating parameter, and at least one communication interface operatively connected to the electronic control unit, the method being adapted to be carried out by an application program installed on board a portable processing device comprising a communication interface adapted to communicate with the communication interface of the vehicle; the method comprising the steps of:

accessing an electronic map of a path by the application program and dividing said path in a plurality of sectors;

storing via the application program a plurality of values of the operating parameter, each of the plurality of values being associated to a corresponding sector;

identifying in real time while driving of the vehicle and via the application program the sector occupied by the vehicle;

transmitting, sector by sector, from the portable processing device to the electronic control unit said plurality of values so that the electronic control unit sets, sector by sector, said operating parameter of the vehicle to the value associated to the occupied sector;

wherein said operating parameter is an operating parameter of a device of the vehicle comprised in the following list of devices: an electronic accelerator device, an ABS braking device, an electronic suspension, a thermal motor, or an electric motor, or a hybrid motor; and wherein the electronic control unit comprises and uses for the control at least one communication line between the electronic control unit and said device of the vehicle, wherein said communication line adopts the CAN bus or LIN Bus or KeyWord 2000 protocol, or an analogic line.

2. The dynamic adjustment method according to claim 1, wherein the application program comprises an offline setting module and a real-time control module, and wherein said steps of accessing and storing are carried out while running the offline setting module and said identifying and transmitting steps are carried out while real-time running the control module.

3. The dynamic adjustment method according to claim 1, wherein the portable processing device is a smartphone or a tablet.

4. The dynamic adjustment method according to claim 1, wherein said communication interfaces are Bluetooth interfaces.

5. The dynamic adjustment method according to claim 1, wherein the accessing step allows a user selecting said map from a plurality of maps.

6. The dynamic adjustment method according to claim 5, wherein the plurality of maps comprises a plurality of maps of racetracks.

7. The dynamic adjustment method according to claim 1, wherein the portable processing device comprises a geo-localization system, and wherein the identifying step comprises a step of detecting a position of the vehicle in a geo-referenced system by said geo-localization system.

8. The dynamic adjustment method according to claim 7, wherein the system is a satellite geo-localization system adapted to acquire position data of the vehicle, and wherein the identifying step comprises a step of correcting and/or integrating the acquired position data with:

dynamic data of the vehicle detected by sensors, installed on the portable processing device and/or the vehicle, for an estimate of an expected position of the vehicle;

data regarding the electronic map of the path.

9. The dynamic adjustment method according to claim 8, wherein said correcting/integrating step comprises a step of calculating a weighted linear combination between said acquired data, said dynamic data, and said data regarding the electronic map of the path.

10. The dynamic adjustment method according to claim 1, wherein said operating parameter includes a plurality of parameters, each of the plurality of parametrs being adapted to affect operation of a corresponding device of the electronically controllable vehicle.

11. The dynamic adjustment method according to claim 1, wherein said step of storing said plurality of values comprises a step of selecting values automatically suggested by the application program or of setting a change with respect to said automatically suggested values.

12. The dynamic adjustment method according to claim 1, wherein said vehicle is a scooter or a motorcycle.

13. An application program comprising a computer code loadable into the memory of a portable processing device provided with a processing unit adapted to perform instructions contained in said computer code to carry out the dynamic adjustment method according to claim 1.

* * * * *